July 5, 1955
H. R. HARLAN
2,712,235
PAINT TESTING MACHINE
Filed Aug. 25, 1952
2 Sheets-Sheet 1
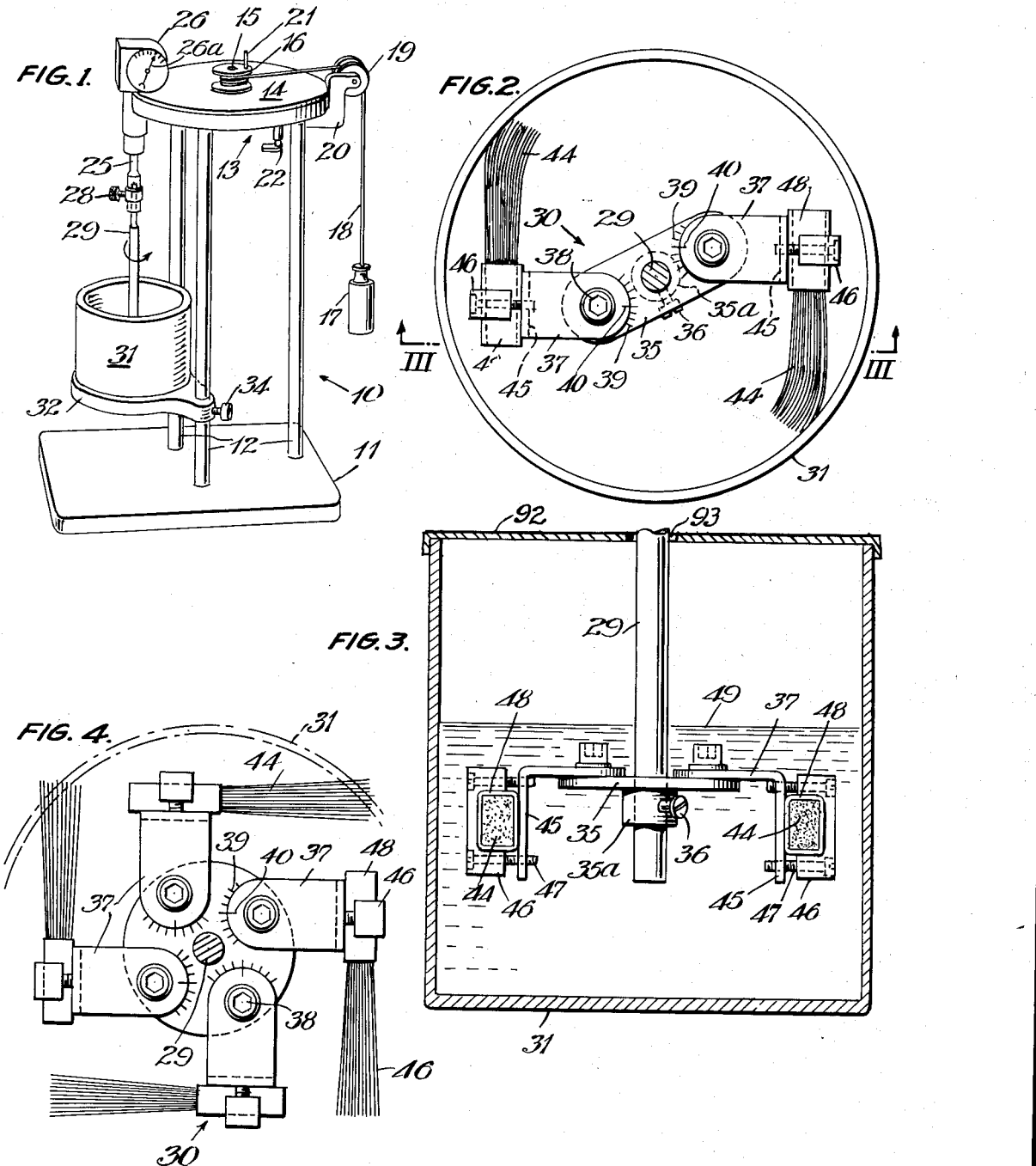
INVENTOR
HAROLD R. HARLAN
BY Henry Gifford Hardy
ATTORNEY

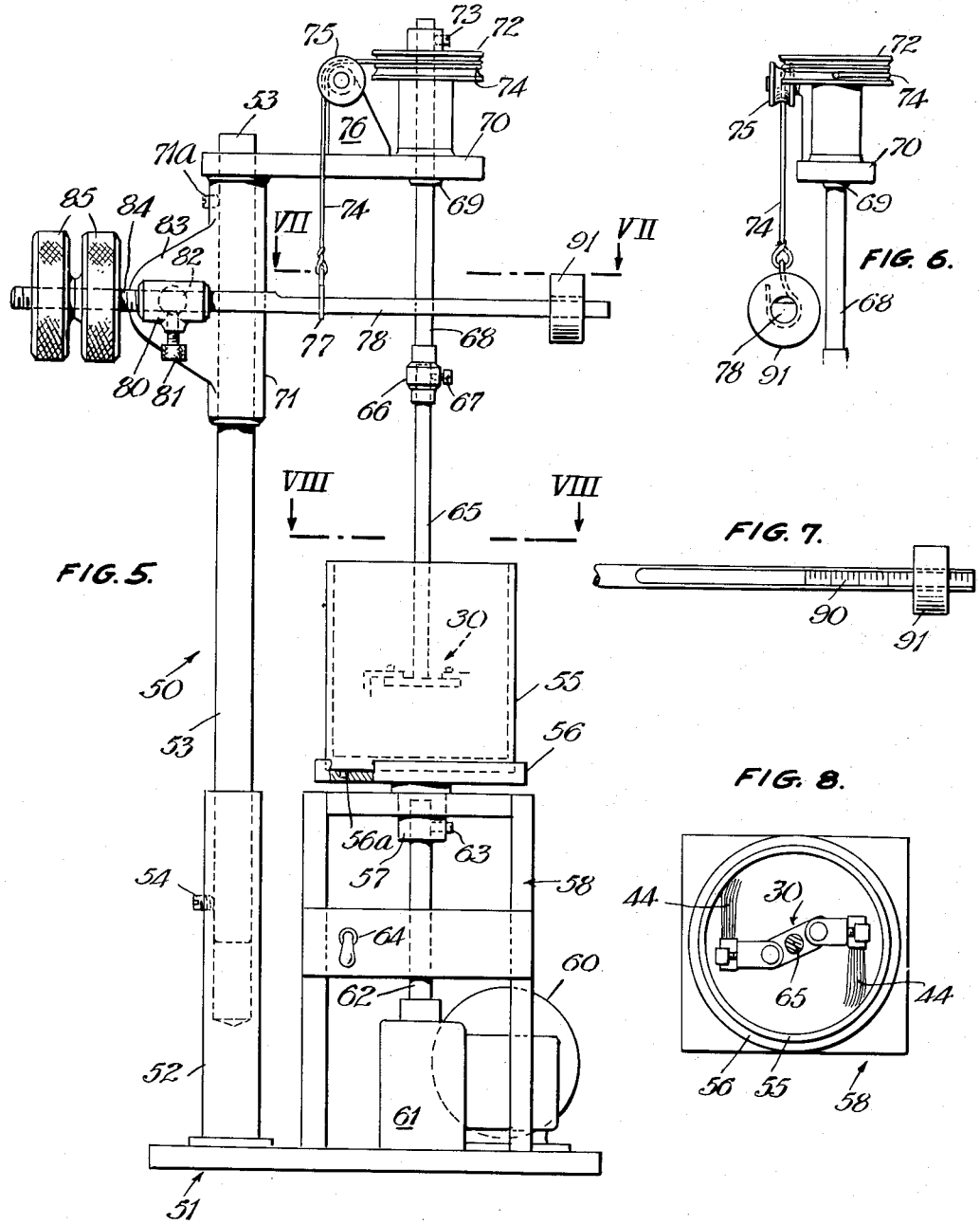

United States Patent Office 2,712,235
Patented July 5, 1955

2,712,235

PAINT TESTING MACHINE

Harold R. Harlan, San Francisco, Calif.

Application August 25, 1952, Serial No. 306,148

8 Claims. (Cl. 73—150)

This invention relates to a machine for testing physical characteristics of paints and the like. More particularly, it relates to a testing machine adapted to test the brushability of paints, varnishes, lacquers and the like.

In one type of known paint testing device intended for the general purpose indicated, a body of paint in a vessel is stirred with paddles rotating in the body of paint, and the time elapsing for the paddles to complete, for example, one hundred revolutions is noted. The lapsed time serves as an indication of the viscosity, and to some degree of the brushability of the paint. However, viscosity is only one factor in determining the "brushability" of a paint, by which is meant the ease or difficulty with which a paint can be applied to a surface with a brush. Brushability may also be defined as the resistance or drag of a paint as it is brushed over a surface. It is, of course, this resistance or drag which is of practical importance to a painter. Thus, the quality of a painting job, and the length of time required to complete a job, depend to a great extent upon the brushability of a paint or other similar coating material.

It is an object of the present invention to provide an improved paint testing device for the purpose described.

It is a further object of the invention to provide a paint testing device which is adapted to measure the brushability, as distinguished from measuring merely the viscosity, of a paint or other similar coating material.

It is a still further and a particular object of the invention to provide a paint testing machine of the character and for the purpose described which is adapted to measure the brushability of a paint and to provide data which correlate reliably with actual painting practice.

It is a further particular object of the invention to provide a paint testing machine of the character and for the purpose described which is simple in its construction and operation and which embodies adjustable features as described hereinafter.

These and other objects of the invention will be apparent from the ensuing description and the appended claims.

Certain forms which the invention may assume are illustrated by way of example in the accompanying drawings, and are described in detail hereinafter.

In the drawings:

Figure 1 is a perspective view of one form of paint testing device constructed in accordance with the present invention.

Figure 2 is a plan view, on a larger scale, of the paint vessel and the brush assembly of Figure 1.

Figure 3 is a vertical section taken through the paint vessel and along the line III—III of Figure 2.

Figure 4 is a top plan view of an alternative form of the brush assembly.

Figure 5 is a view in side elevation of an alternative and preferred form of paint testing machine constructed in accordance with the invention and including a motor drive for the paint vessel.

Figure 6 is a fragmentary elevational view of the uppermost portion as seen from the right of Figure 5.

Figure 7 is a fragmentary top plan view of the pivot rod as seen along the line VII—VII of Figure 5.

Figure 8 is a plan view of the paint vessel and brush assembly of Figure 5 as seen along the line VIII—VIII thereof.

Referring now to the drawings, and more particularly to Figures 1, 2 and 3, the machine or device as a whole is indicated by the numeral 10 and it comprises a flat base 11, to which are fixed spaced upright rods ar stanchions 12. The rods 12 support a driving element 13 of known construction, including a gear case 14 within which suitable gearing (not shown) is disposed. This gearing is driven by a vertical shaft 15 to which is fixed a winding drum 16. The drum 16 and shaft 15 are driven by a weight 17 which is fixed to one end of a cord 18. The cord 18 is led over a guide pulley 19 rotatably mounted on a bracket 20, and at its other end is fixed to the drum 16. A handle 21 is provided for winding the cord 18 on the drum, and a release member 22 is provided to release the drum.

The driving element 13 also includes a shaft 25 which is driven by the gearing in gear case 14, and an indicator 26 which visually shows the revolutions of the shaft 25. The shaft 25 is coupled at its lower end by means including a set screw 28 to the upper end of a shaft 29, the lower end of which is fixed to a brush assembly 30. The brush assembly 30, which is best shown in Figures 2 and 3, is mounted to rotate in and concentrically of a cylindrical paint vessel 31, the interior surface of which presents a uniform surface for receiving a test film. The vessel 31 rests upon a base 32 (see Figure 1) which is adjustably mounted on and fixed to one of the upright frame rods 12 by a set screw 34 or any other suitable means.

The brush assembly 30 comprises a flat, elongated bracket 35 having a downwardly extending collar or sleeve 35a which is adjustably fixed to the shaft 29 by means of a set screw 36. An L-shaped bracket 37 is adjustably fixed to each end of the bracket 35, as by means of an Allen screw 38. The bracket 35 is formed, adjacent each of the angle brackets 37, with a scale 39, and each of the angle brackets 37 is formed with a pointer or marker 40 for cooperation with the scale 39. A brush 44 is clamped to the vertical leg 45 of each of the angle brackets 37, as by means of a U-shaped clamping member 46 and cap screws 47. Each of the brushes 44 is also provided with a sheathing 48 which encompasses the heel of the brush and is received between the angle bracket 37 and the clamping member 46.

In operation, a body of paint or other liquid whose brushability is to be tested is placed in the paint vessel 31 to a level not to exceed that indicated by the numeral 49 in Figure 3. The movable base 32 is then adjusted so that the brush assembly 30 will rotate within the vessel above the liquid level 49 and is then held in the adjusted position by the set screw 34. The brushes of the brush assembly are immersed in the liquid and rotated therein to thoroughly wet the brushes. Following this the vessel 31 is raised by hand and lowered to the base several times so that the brushes during rotation will apply a film of paint or other liquid, to the inside wall above the liquid level. After the brushes are thoroughly wet and the liquid film has been applied to the inner surface of the wall above the liquid level, the vessel 31 is lowered to its position on the base 32 which centers it precisely with the axis of rotation of shaft 29. The spindle 16 is rotated by means of a handle 21, in a clockwise direction, to lift the counterweight 17 until the pointer 26a on the meter 26 is at zero or any other convenient starting point. The spindle 16 is then released by means of the release member 22 to allow the counterweight to fall freely. By this means the shaft 29 and the brush assembly 30 are rotated with the wet brushes contacting the coated surface above the liquid level in the vessel 31. The time elapsing for a given number of revolutions, e. g., ten revolutions, is clocked by means of a stop watch or in any other suitable manner. This elapsed time constitutes a measure of the brushability of the paint or other liquid. Thus, a paint which has difficult brushability will require a greater time than an easily brushable paint. For a more precise determination, the brushes may be allowed one to four complete rotations before the count and timing of a selected number of rotations is made. The number of rotations which may be required to indicate brushability accurately, may be varied at the option of the operator so long as a standard is established, but it has been found that the smallest number of revolutions which will give reproducible results within the shortest period of time, is the most satisfactory for determining brushability. Increased number of revolutions and longer periods of time may produce erratic results due to solvent evaporation or latent viscosity characteristics which do not ordinarily exist during brush application of coatings.

Referring now to Figures 5 to 8, and more particularly to Figure 5, a motor driven paint testing device is there illustrated and is generally designated by the numeral 50. It comprises a flat base 51 to which a tubular standard 52 is fixed which slidably receives a rod 53 and is provided with a set screw 54 to clamp the rod 53 in a suitable position. The device 50 also includes a cylindrical paint vessel 55 which is seated on a rotatable base 56 and is keyed thereto by means of a pin 56a. The base 56 is formed with a collar 57 which is journalled in a framework 58. The vessel 55 is rotated by means of a motor 60, which is clamped to the collar 57 by means of a set screw 63. A switch 64 is provided for operating the motor.

A brush assembly 30 is also provided which, as illustrated, is identical with that shown in Figures 2 and 3. It may, of course, be a four-brush assembly such as shown in Figure 4. The brush assembly 30 is mounted at the lower end of a shaft 65, the upper end of which is coupled by means of a coupling member 66 and a set screw 67 to a shaft 68. The shaft 68 is journalled in a bearing 69 formed in a bracket 70 which is slidably mounted on the rod 53 by means of a sleeve 71. The sleeve 71 and bracket 70 are clamped in a suitable position by means of a set screw 71a. The shaft 68 extends above the bracket 70 and is fixed to a pulley 72 by means of a set screw 73. A cord 74 has one end fixed to the pulley 72 and is led over a guide pulley 75 rotatably mounted on a bracket 76, and the cord 74 is provided with a hook 77 at its other end which engages a pivot rod 78. The pivot rod 78 extends through a sleeve 80 and is clamped thereto by means of a set screw 81. The sleeve 80 is rotatable on a pin 82 which is fixed to an ear or bracket 83 formed on the sleeve 71. The left-hand end of the pivot rod 78, as viewed in Figure 5, is threaded at 84 to receive threaded counterweights 85. At its other or right-hand end the pivot rod 78 is formed with a scale 90 (see Figure 7) and it slidably receives a weight 91.

In operation the device described above and illustrated in Figures 5 to 8 functions as follows:

Paint or other liquid which is to be tested is placed in the vessel 55, care being exercised that the liquid level does not prevent the free rotation of the brush assembly 30 within the vessel and above the liquid level. The brush assembly 30 is coupled to the shaft 68 at a point adjacent its lower end and the bracket 70 and sleeve 71 are adjusted and marked in position so that the brushes 44 will rotate above the liquid level and engage the inner face of the wall of the vessel 55. The switch 64 is then turned on to operate the motor 60 which will, of course, rotate the vessel 55. The sleeve 71 is then loosened from the marked adjusted position. While the assembly is thus loosened, the bracket 71 is raised and lowered several times so that the wet brushes will apply a film of liquid to the inner surface of the vessel 55 above the liquid level. When the brushes are thoroughly wet and a film has been established above the liquid level, the motor is shut off and the sleeve 71 returned to the adjusted position and held in that position. The weight 91 is then set at zero or at any other suitable reference point on the scale 90. The counterweights 85 are adjusted to level the pivot rod 78 and maintain it in horizontal position while the brush assembly is at rest. The switch is then turned on to operate the motor and revolve the vessel 55. The brushes 44 of the brush assembly 30 will sweep the inner surface of the vessel 55 and engaging the film on the wall above the liquid level and will exert a certain degree of drag depending upon the brushability of the paint or the shearing force required to move the brushes over the film. This drag will tend to rotate the brush assembly 30 and with it the shaft 65. Assuming the rotation of the brush assembly 30 to be counterclockwise as viewed in Figure 8, rotation of the shaft 65 will be in the same direction and will tend to wind the cord 74 about the pulley 72. This will tend to lift the right hand end of the rod 78, that is, to rotate it about the axis of the pivot pin 82 in counterclockwise direction. Meanwhile, the operator will adjust the weight 91 to counteract the drag of the brushes 44 and to level off the pivot rod 78. In practice, the rod 78 will oscillate about a median position, and the weight 91 will be adjusted so that this median position is horizontal. The reading of weight 91, i. e., the point on the scale 90 at which the pivot rod 91 is level, will provide a measure of the brushability of the paint. Thus, the weight 91 will require movement outwardly to a greater scale reading for a difficultly brushable paint than for an easily brushable paint.

In employing either of the paint testing devices illustrated in Figures 1 and 5, it is preferred to employ a standard or reference liquid to calibrate the meter 26 of the device of Figure 1 or the scale 90 of the device of Figure 5. A variety of suitable reference liquids are available, among which may be mentioned glycerine, heavy lubricating oil, castor oil and strained lard oil. These and other similar liquid materials are commercially available in standardized form to provide a standard reference liquid. If paints having a low degree of brushability are being tested, a reference liquid of relatively low brushability is used, while a reference liquid having a high degree of brushability will be employed for test paints having a high degree of brushability. Either form of device can be calibrated over a considerable range of brushability, merely by employing several reference liquids representing high, medium and low degrees of brushability. In practice, there is excellent correlation between readings of the meter 26 or the scale 90, and the experience of professional painters with regard to the ease or difficulty of application of paints.

As illustrated in the drawings, the brushes 44 can be adjusted to form any desired angle with the interior wall of the paint vessel. It is preferred to adjust the brushes to make a constant and even contact with the walls of the paint vessel, to spread an even film of paint, and to pass smoothly over the film of paint. They should not be set at an angle to create a considerable drag or braking action. Once the brushes have been set at a suitable angle, and assuming that their brushing characteristics remain constant, the angle need not be changed thereafter. However, owing to wear of the brushes and to inevitable variations between individual brushes, it is necessary from time to time to readjust the brushes. It is, of course, desirable in any testing equipment to maintain all factors constant except that which is being subjected to test and which it is intended to vary. For the reasons stated it is not possible to achieve this result in the case of the brushes; a given set of brushes will change its characteristics after long use, and a new brush will not have the same brushing characteristics as an old brush for which it has been substituted. While brush assemblies having two and four brushes are shown herein, it is to understood that any number of brushes may be used.

To compensate for these variations, a new set of brushes, for example, will be tested in a reference liquid and the counterweight 17 of the device of Figure 1, or the counterweights 85 of the device of Figure 5, will be re-adjusted as necessary to produce a reading on the counter 26 or the scale 90 which corresponds exactly to the reading obtained with the old brushes which have been replaced.

A cover 92 may be used for the paint vessels 31 and 55 as shown in Figure 3, to limit evaporation in case highly volatile elements are involved, and, in any event, to minimize evaporation. An opening 93 is provided therein to permit the passage of shaft 29 or 65 therethrough without interference with rotation.

It will thus be apparent that a paint testing device has been provided which is simple in its construction and operation and which operates upon the principle of relative sweeping movement of a brush or the like over a film of paint on a solid surface, thus closely simulating actual painting practice. The resistance to this sweeping movement, which may be manifested by the speed of relative movement, or by the force required to prevent movement of one of the elements, provides an accurate measure of brushability.

In both its modifications as illustrated in the drawings and described hereinabove, the paint testing device of the present invention accurately measures brushability and not merely the viscosity of a paint. This is of major importance in that two paints of the same viscosity may have widely different brushing characteristics. The device is very simple to operate and requires only a minimum of calibration. As explained, the brushes are easily adjustable at the outset to produce the proper degree of drag, and they are easily readjusted after substitution of new brushes to the end that the brushing characteristics are kept constant.

The term "paint" is used throughout as a convenient general term. The device of this invention is equally applicable to testing lacquers, varnishes and other coating materials which are intended to be applied by a brush or roller.

I claim:

1. A testing device of the character described for testing the brushability of a liquid on a solid surface, which comprises a cylindrical vessel for receiving liquid and providing a uniform test surface for a film of test liquid above the liquid level, bristled brushing means for applying a film to said surface, means for producing relative movement of said brushing means and test surface with no vertical load and calibrated means for measuring resistance to such relative movement offered by the drag of said brushing means on said film.

2. A testing device of the character described for testing the brushability of a liquid on a solid surface, which comprises a cylindrical vessel for receiving liquid and providing a uniform test surface for a film of test liquid above the liquid level, bristled brushing means for applying a test film to said surface, means for moving said brushing means to contact and traverse said film with no vertical load and calibrated means for measuring resistance to such movement offered by the drag of said brushing means on said film.

3. A testing device of the character described for testing the brushability of a liquid on a solid surface, which comprises a cylindrical vessel for receiving liquid and providing a uniform test surface for a film of test liquid above the liquid level bristled brushing means for spreading a film on said surface, means for producing movement of said test surface relative to said brushing means with no vertical load and means for measuring the resistance to such movement offered by the drag of said brushing means on said film.

4. A testing device of the character described for testing the brushability of a liquid on a solid surface which comprises a cylindrical vessel for receiving liquid and providing a test surface for a film of test liquid above the liquid level, bristled brushing means for spreading said film on said surface, means for moving said brushing means across said surface through said film with substantially no vertical load, and means for measuring the rate of movement thereof and thereby measuring the resistance to such movement offered by the drag of said brushing means through said film.

5. A testing device of the character described comprising a cylindrical vessel for holding a test liquid and providing a surface for a test film thereof above the liquid level, means for rotating said vessel, bristled brush means, means mounting said brush means axially within said vessel and in brushing contact with its said test surface with substantially no vertical load, and means for measuring the force tending to rotate said brush means, said measuring means comprising a lever, an adjustable counterweight carried by said lever for opposing said force, and a scale cooperable with said counterweight to indicate said force.

6. A testing device of the character described comprising a cylindrical vessel for holding a test liquid and providing a surface for a test film thereof above the liquid level, means for rotating said vessel, a bristled brush assembly comprising a plurality of radially arranged brushes, means including a shaft for mounting said brush assembly axially within said vessel in brushing contact with the interior surface thereof with substantially no vertical load, a lever having a fulcrum, a counterweight carrier by said lever, a scale cooperable with said counterweight, and means operatively connecting said shaft with said lever to rock the lever when said shaft is rotated, said counterweight being adjustable and cooperable with said scale to counterbalance the force tending to rotate the shaft and to indicate the degree of said force.

7. A brush assembly for a paint testing device comprising a shaft, a bristled brush in a plane at right angles to the axis of said shaft, and means mounting the brush on the shaft and adjustable to vary the angle of the brush in said plane relatively to the shaft.

8. A brush assembly for a paint testing device comprising a shaft, a plurality of brushes, and means mounting said brushes equiangularly about the axis of said shaft in a plane at right angles to the axis of the shaft.

References Cited in the file of this patent

UNITED STATES PATENTS

| | | |
|---|---|---|
| 2,016,779 | Hardgrove | Oct. 8, 1935 |
| 2,020,565 | Neely | Nov. 12, 1935 |
| 2,036,315 | Barnhart | Apr. 7, 1936 |
| 2,196,613 | Shaw | Apr. 9, 1940 |
| 2,519,259 | Liebman | Aug. 15, 1950 |